US008381950B2

(12) United States Patent
Veltrop et al.

(10) Patent No.: US 8,381,950 B2
(45) Date of Patent: Feb. 26, 2013

(54) PISTON AND PISTON ROD FOR A RODLESS DISPENSER

(75) Inventors: Loren Veltrop, Chicago, IL (US); Donald Van Erden, Grayslake, IL (US); Paulette Van Erden, legal representative, Grayslake, IL (US); Eric Schmidt, Forest Park, IL (US); Scott Rote, New Lenox, IL (US); Daniel Somen, Chicago, IL (US); Mark Kurth, Chicago, IL (US); Aaron Eiger, Chicago, IL (US); Timothy Payne, Chicago, IL (US)

(73) Assignee: Prince Castle, LLC, Carol Stream, IL (US)

( * ) Notice: Subject to any disclaimer, the term of this patent is extended or adjusted under 35 U.S.C. 154(b) by 407 days.

(21) Appl. No.: 12/703,613

(22) Filed: Feb. 10, 2010

(65) Prior Publication Data

US 2011/0168742 A1 Jul. 14, 2011

Related U.S. Application Data

(63) Continuation-in-part of application No. 12/684,579, filed on Jan. 8, 2010.

(51) Int. Cl.
*B67D 7/60* (2010.01)
*G01F 11/00* (2006.01)

(52) U.S. Cl. ........................................ 222/392; 222/391

(58) Field of Classification Search .......... 222/390–392, 222/327, 386

See application file for complete search history.

(56) References Cited

U.S. PATENT DOCUMENTS

| | | | |
|---|---|---|---|
| 1,591,693 | A | 7/1926 | Atz |
| 2,045,261 | A | 6/1936 | Chute |
| 3,031,066 | A | 4/1962 | Leach |
| 3,051,264 | A | 8/1962 | Batchelor |
| 3,782,598 | A | 1/1974 | Basa |
| 3,831,455 | A | 8/1974 | Patrignani |
| 3,976,166 | A | 8/1976 | Charpentier |
| 4,154,153 | A | 5/1979 | Stickle |
| 4,318,499 | A | 3/1982 | Hamilton |
| 4,984,952 | A | 1/1991 | Reuter |
| 5,064,098 | A | 11/1991 | Hutter, III et al. |
| 5,295,614 | A | 3/1994 | Chang |
| 5,323,931 | A | 6/1994 | Robards, Jr. et al. |
| 5,479,460 | A | 12/1995 | Wrobel |
| 5,979,538 | A | 11/1999 | Braun et al. |
| 6,109,424 | A | 8/2000 | Doan |
| 6,148,925 | A | 11/2000 | Moore |

(Continued)

FOREIGN PATENT DOCUMENTS

| | | | |
|---|---|---|---|
| DE | 3513880 | A1 | 10/1986 |
| DE | 4216541 | A1 | 11/1993 |

(Continued)

OTHER PUBLICATIONS

European Search Report—Application No. EP 11 15 2687.

(Continued)

*Primary Examiner* — Paul R Durand
*Assistant Examiner* — Vishal Pancholi
(74) *Attorney, Agent, or Firm* — Kelly & Krause LP; Joseph P. Krause, Sr.

(57) ABSTRACT

A piston and piston rod for a rodless dispenser for extrudable material are configured such that compressive force exerted on the piston from a push chain causes a reactive torque to be created that locks the links of the chain together. The push rod is located away from the piston's geometric center.

25 Claims, 16 Drawing Sheets

U.S. PATENT DOCUMENTS

| | | | |
|---|---|---|---|
| 6,224,037 | B1 | 5/2001 | Novick |
| 6,260,737 | B1 * | 7/2001 | Gruendeman ................ 222/391 |
| 6,321,945 | B1 | 11/2001 | Girouard et al. |
| 6,354,793 | B1 | 3/2002 | Gammerler et al. |
| 6,382,466 | B1 * | 5/2002 | Schneider et al. ............ 222/137 |
| 6,386,401 | B1 | 5/2002 | Dodd et al. |
| 6,413,185 | B1 | 7/2002 | Baginski et al. |
| 6,427,823 | B1 | 8/2002 | Ishikawa et al. |
| 6,543,311 | B1 | 4/2003 | Baginski et al. |
| 6,702,094 | B2 | 3/2004 | Ishikawa et al. |
| RE38,555 | E | 7/2004 | Braun et al. |
| 6,981,621 | B2 | 1/2006 | Brandeis et al. |
| 7,270,619 | B2 | 9/2007 | Bourc'His |
| 2002/0056538 | A1 | 5/2002 | Shaffer |
| 2003/0205356 | A1 | 11/2003 | Braun et al. |
| 2004/0173408 | A1 | 9/2004 | Szymanski et al. |
| 2004/0177934 | A1 | 9/2004 | Olmsted |
| 2005/0145653 | A1 | 7/2005 | Brandeis et al. |
| 2005/0242228 | A1 | 11/2005 | Wagner et al. |
| 2006/0163007 | A1 | 7/2006 | Bukowski et al. |
| 2008/0083167 | A1 | 4/2008 | Olmsted et al. |
| 2008/0264971 | A1 | 10/2008 | Harre et al. |
| 2009/0008615 | A1 | 1/2009 | Young et al. |
| 2009/0019724 | A1 | 1/2009 | Wagner et al. |
| 2009/0159613 | A1 | 6/2009 | Rusch |
| 2009/0224006 | A1 | 9/2009 | Post et al. |

FOREIGN PATENT DOCUMENTS

| | | | |
|---|---|---|---|
| EP | 0403576 | B1 | 12/1990 |
| EP | 4035000076 | | 12/1990 |
| EP | 8762000031 | | 11/1998 |
| EP | 0936378 | Al | 8/1999 |
| EP | 0969226 | B1 | 1/2000 |
| EP | 9692000026 | | 1/2000 |
| EP | 0994231 | B1 | 4/2000 |
| EP | 9942000031 | | 4/2000 |
| EP | 1006000074 | | 6/2000 |
| EP | 1591000402 | | 11/2005 |
| EP | 1591000693 | | 11/2005 |
| EP | 2019000278 | | 1/2009 |
| GB | 4624000022 | | 3/1937 |
| GB | 2076473 | A | 10/1980 |
| JP | 2001254796 | A | 9/2001 |
| JP | 2003314630 | A | 11/2003 |
| JP | 2004108473 | A | 4/2004 |
| JP | 2005282745 | A | 10/2005 |
| JP | 2005337346 | A | 12/2005 |
| JP | 2007289856 | | 8/2007 |
| JP | 2007-289856 | | 11/2007 |
| WO | WO 8911602 | | 11/1989 |
| WO | WO 2006005942 | | 1/2006 |
| WO | WO 2007122129 | | 11/2007 |

OTHER PUBLICATIONS

DE 4216541 A1 Translation (Abstract and Description).

USPTO Office Action Dated Apr. 11, 2012 for U.S. Appl. No. 12/684,597, filed Jan. 8, 2010.

USPTO Office Action Dated Apr. 11, 2012 for U.S. Appl. No. 12/684,597, filed Jan. 8, 2010 Examiner Search strategy.

State of Intellectual Property Office of the People's Republic of China The First Office Action Issue date Jun. 25, 2012; Application No. 20111003407.X; Issue No. 2012061901025260; Applicant: Prince Castle LLC; Title: Rodless Dispenser for Extrudable Materials and Having a Contents Indicator.

USPTO, Office Action communication dated Oct. 9, 2012, U.S. Appl. No. 12/684,597.

* cited by examiner

PISTON AND PISTON ROD FOR A RODLESS DISPENSER

RELATED APPLICATIONS

This application is a continuation-in-part of U.S. patent application Ser. No. 12/684,597, which was filed Jan. 8, 2010, and which is entitled Rodless Dispenser.

BACKGROUND

Mechanical dispensers for viscous or extrudable materials include common, piston-type caulking guns found in any hardware store as well as small, hand-held devices for rolling up a flexible tube, such as the tubes that dispense toothpaste. Most extrudable material dispensers employ a piston attached to one end of an elongated piston rod. The piston is advanced through a partial-cylinder the shape of which is reminiscent of a trough and which is hereafter referred to as a holding cylinder or simply cylinder, the function of which is to hold a cylindrical canister of extrudable material.

Extrudable material in a canister is forced from the canister through a canister tip by driving a canister-internal piston installed into the "bottom" of the canister. The piston in the bottom of canister is hereafter referred to as a canister piston.

The canister piston drives extrudable material from the canister when the canister piston is driven through the canister by the piston attached to the piston rod. The piston rod is driven by a pistol grip mechanism that forms part of the dispenser. The pistol grip mechanism can be attached to either a ratcheting or ratchetless transmission device. Actuation of the pistol grip causes the piston rod to be advanced into the cylinder, which in turn drives the first piston (attached to the connecting rod) into the second piston (in the bottom of a canister of extrudable material) forcing extrudable material from the dispensing tube. As the first piston moves away from the transmission device and into the dispensing tube, extrudable material is forced from the tip of the canister.

FIG. 1 displays a side view of a typical prior art extrudable material dispenser described above. The first piston 21 in the cylinder is urged against the canister piston in the tube of extrudable material by operating the trigger 16, which is rotatably mounted in the handle 14. Grooves or teeth 17, formed in the elongated push rod 19 are engaged by a ratchet mechanism inside the handle 14 and not shown. The ratchet mechanism can be considered to be a "transmission" that converts the force applied to the trigger 16 into lateral displacement of the piston rod and first piston 21.

A problem with prior art caulking guns or other dispensers for extrudable materials is that the push rod 19 extends outwardly from the handle 14, which makes the dispenser 5 unwieldy. The extended rod 19 also makes the dispenser 5 difficult to store or set down between uses, especially when such devices are used in close quarters, as often happens when the devices are used in restaurants to dispense condiments and other extrudable food products.

A dispenser for dispensing extrudable material which eliminates the push rod 19 would be an improvement over the prior art.

DETAILED DESCRIPTION

Figure 1:
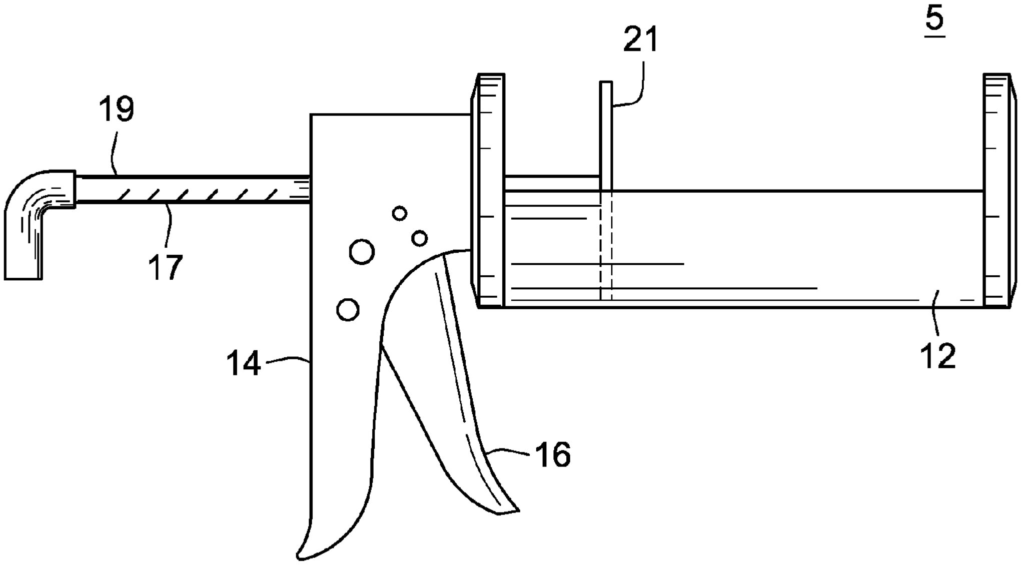
FIG. 1 (PRIOR ART)
FIG. 1 is a side view of a prior art extrudable material dispenser.
Figure 2:
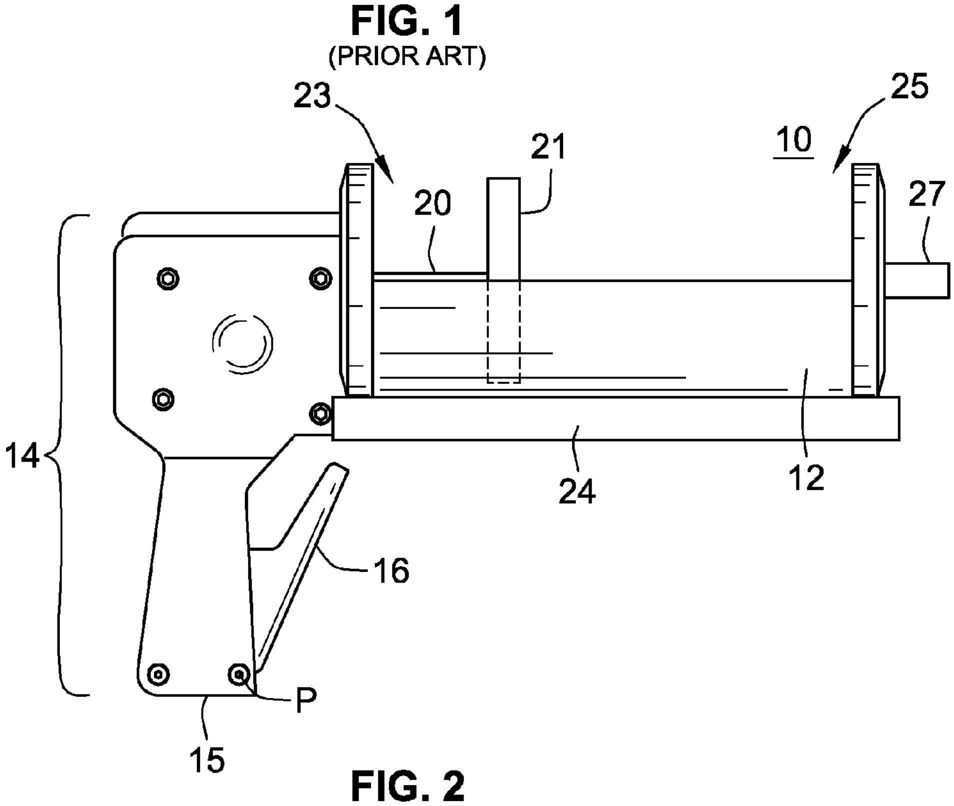
FIG. 2 is a side view of a rodless dispenser for extrudable materials.

FIG. 2 is a side view of a rodless dispenser 10 for dispensing extrudable materials by hand. The dispenser 10 is comprised of a cylinder 12, formed without a top "half" in order to allow tubes or canisters of extrudable materials to be inserted into and removed from the dispenser 10. The "half-cylinder" 12 for holding tubes or canisters is nevertheless referred to herein as a cylinder.

A housing, which acts as a handle 14, is attached to, or integrally formed as part of the cylinder 12. A lower or bottom end of a reciprocating trigger 16 is pivotally attached to the lower or bottom end 15 of the handle 14 at a pivot point P. When the trigger 16 is squeezed, it slides into the handle 14 where a trigger return spring, not visible in FIG. 2, is compressed when the trigger 16 is squeezed. Tension in the trigger return spring causes the trigger 16 to return to its starting position (exit from the handle 14) when a user releases the trigger 16. The trigger 16 can thus be cyclically squeezed and released.

Squeezing the trigger 16, drives a chain sprocket within the handle 14 on a bearing supported by the handle. A push chain, which is wrapped part way around the sprocket, is used to exert a force against a piston 26 in the cylinder 12 when the sprocket is rotated by the trigger 16. Force exerted by the piston 26 in the cylinder 12 through the push chain 24 drives extrudable material 23 out of a tube or canister 21. Cyclically actuating the trigger 16 thus dispenses extrudable material 23 using a push chain, instead of an elongated push rod, such as the ones used in prior art dispensers.

Push chains are well known. A push chain is a chain that can be looped or folded for storage but which becomes rigid when subjected to a compressive or thrust load. Push chains can also be used to exert a tensile force. Push chains can thus be used to push as well as pull. In the figures, the push chain is stored in a magazine adjacent the cylinder 12, looped part way around a driven sprocket and connected to the back side of a piston in the cylinder 12.

Figure 3A:
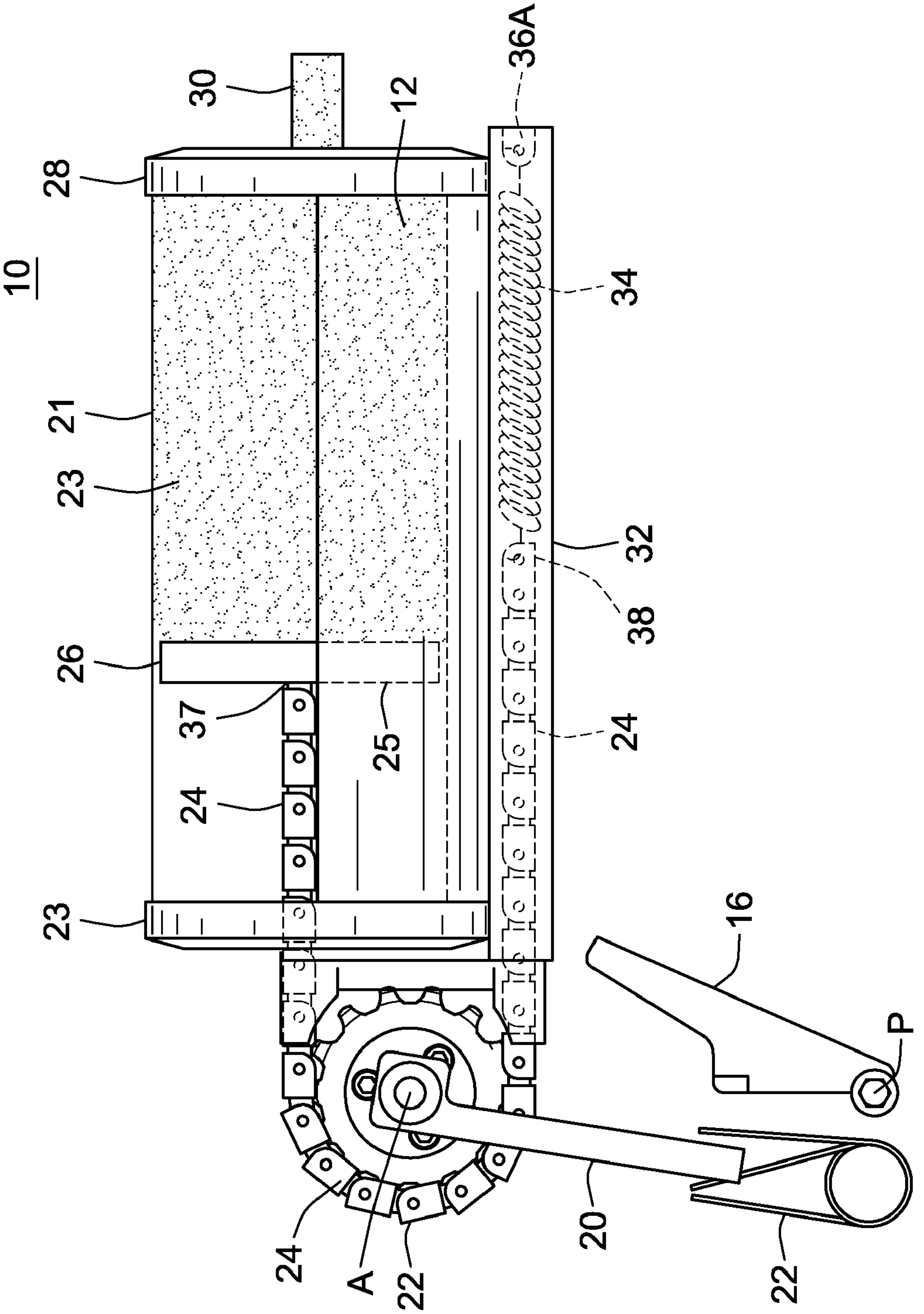
FIG. 3A is a right-side cutaway of the dispenser shown in FIG. 2.

FIG. 3A is a cross-sectional view of the dispenser shown in FIG. 2, as viewed from the right side of the dispenser 10. Squeezing the trigger 16 to force it into the handle 14 causes the trigger 16 to pivot counterclockwise (as shown in FIG. 3) around pivot point P. In so doing, the trigger 16 compresses a trigger return spring 18 and urges a swing arm 20 clockwise around P. The swing arm 20 is attached to the sprocket 22. Rotating the swing arm 20 clockwise around P causes the swing arm 20 to rotate clockwise around the axis A of a sprocket 22.

Figure 7:
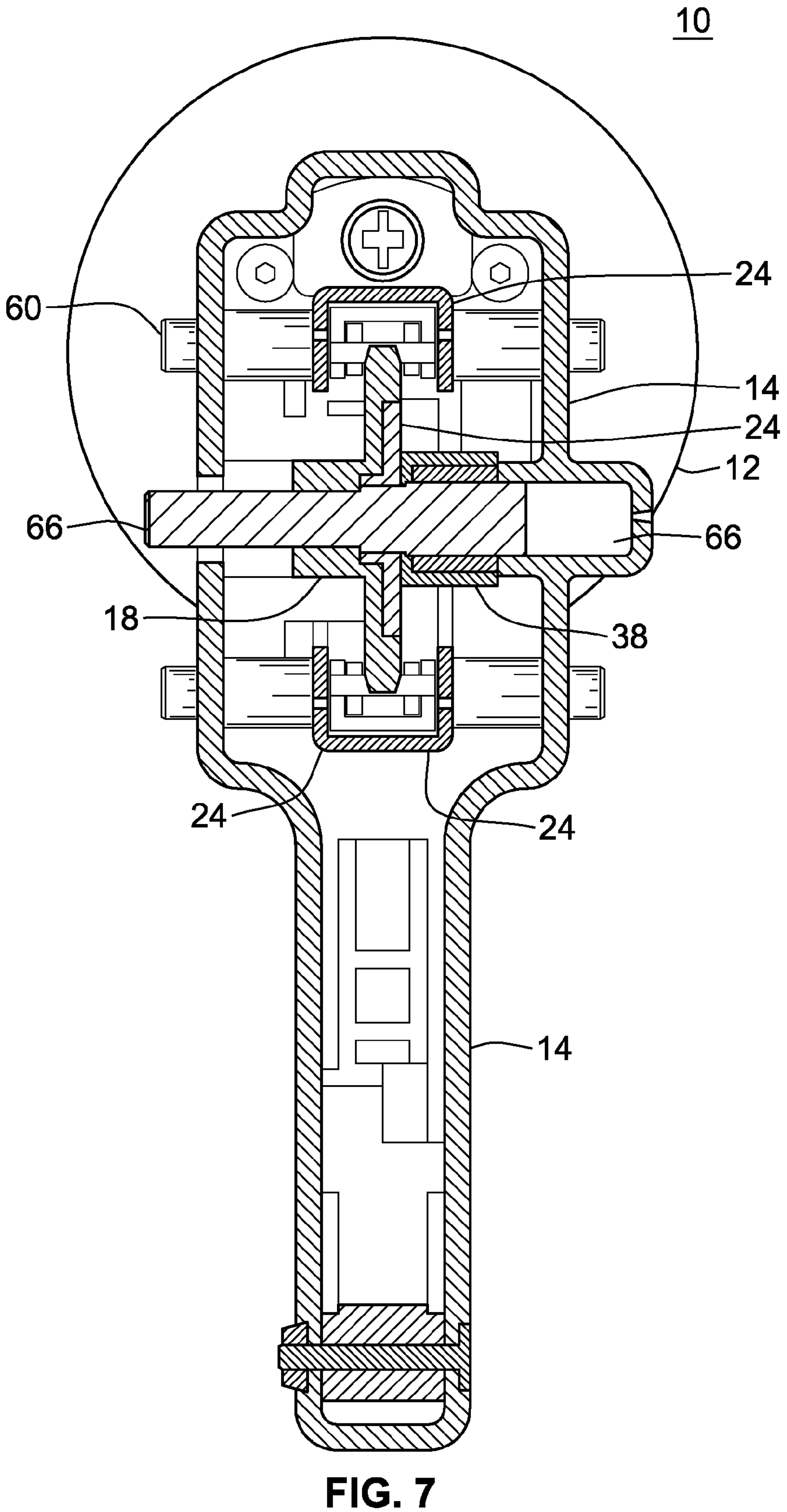
FIG. 7 is an end view of the device shown in FIG. 2.

The swing arm 20 is rotatably attached to the sprocket 22 via a one-way bearing, visible in FIG. 7 but not visible in FIG. 3. The one-way bearing is mounted in the handle 14 such that rotation of the swing arm 20 around the sprocket's axis A in a clockwise direction drives the sprocket 22 clockwise, however a releasable ratchet mechanism shown in FIG. 4 prevents the sprocket from rotating counterclockwise, at least until the ratchet mechanism is disengaged from the sprocket 22. When the sprocket 22 is "held in place" by the ratchet mechanism, the one-way bearing permits the swing arm 20 to return to its starting position, as shown in FIG. 3. Once the swing arm 20 returns to its starting location, the trigger 16 can be actuated again, i.e., rotated counterclockwise around P to engage the swing arm 20. Repeated cycling of the trigger 16 thus drives the sprocket 22 incrementally clockwise. The one-way bearing and ratchet mechanism thus enable the sprocket 22 to advance clockwise incrementally but prevent the sprocket 22 from rotating counterclockwise, until the ratchet is released or disengaged from the sprocket 22. Advancing the push chain 24 into the cylinder 12 by rotating the sprocket 22 clockwise with each trigger actuation causes the piston 26 to move incrementally from the proximal end 23 of the cylinder 12 toward the distal end 28, forcing extrudable material 23 out of the tube or canister 21 along the way. Releasing the trigger 16, however, does not reverse the sprocket 22 or pull the push chain 24 out of the cylinder 12.

Still referring to FIG. 3A, the push chain 24 has a first end 37 attached to the center of the back side 25 of the piston 26. The push chain 24 also has a second end 38 inside a chain magazine 32 and attached to a push chain return spring 34.

A center or middle section of the push chain 24 is wrapped approximately half-way around the chain sprocket 22. A first portion of the chain 24, which is located between the sprocket 22 and first end 37 of the chain 24, extends from the teeth of the sprocket 22 part way into the cylinder 12 to where the first end 37 of the chain is attached to the back side 25 of the piston 26. A second portion of the push chain 24, which is located between the sprocket 22 and second end 38 of the chain 24, extends from the sprocket 22 into a chain magazine 24 that is located immediately below, adjacent to, and parallel to, the cylinder 12. Each actuation of the trigger 16 thus pulls a length of push chain 24 from the magazine 24, stretching the push-chain return spring 34 and pushes the same amount of chain into the cylinder 12.

A coil-type push chain return spring 34 is tethered to the second end 38 of the spring 24 and the distal end 36 of the magazine 24. The return spring 34 maintains the second part of the push chain 24 in tension as the chain 24 is driven down the cylinder 12 and acts to pull the chain 24 out of the cylinder 12 and back into the magazine 24 when the aforementioned ratchet mechanism is released.

Figure 3B:
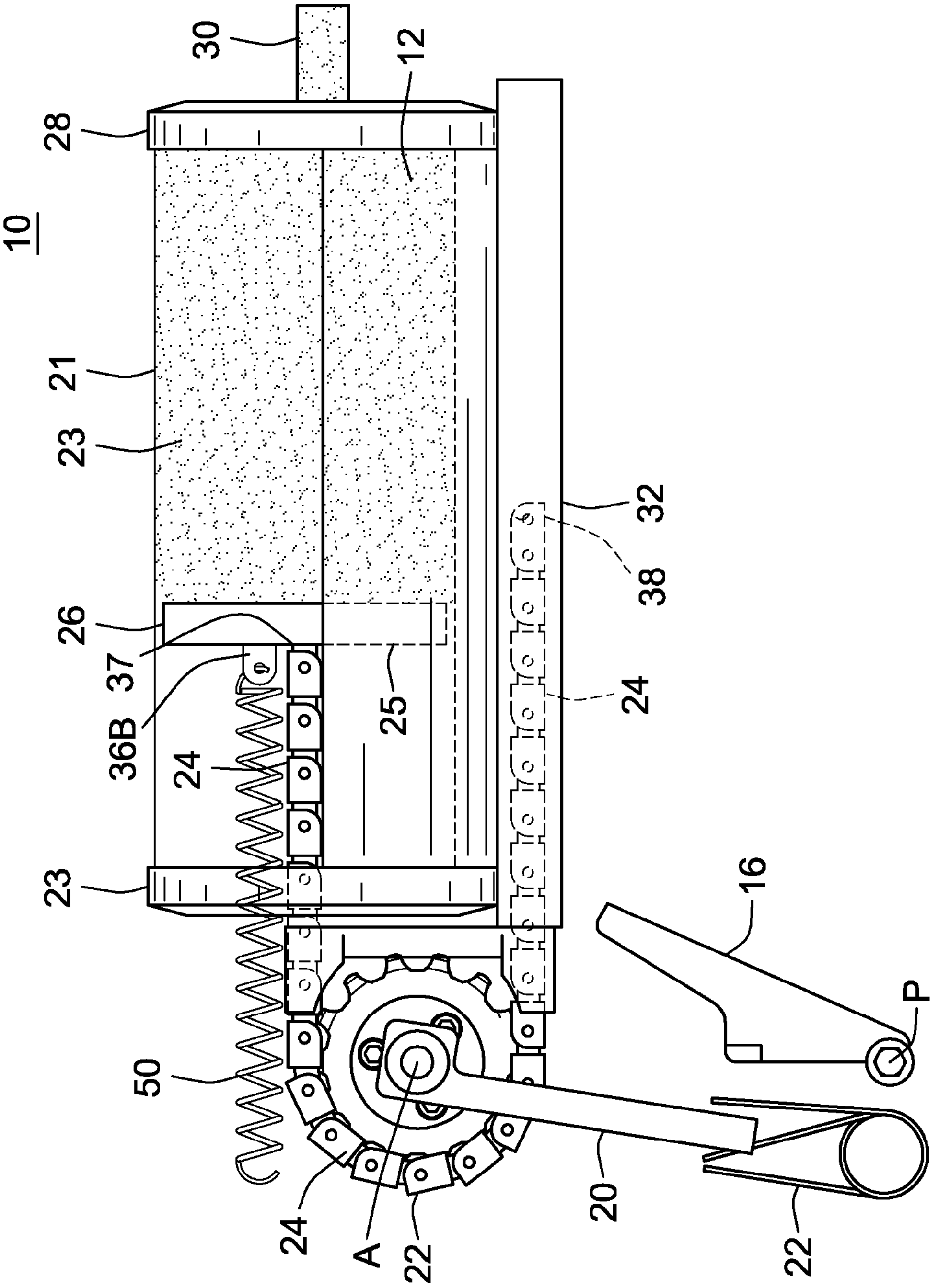
FIG. 3B is a right-side cutaway of an alternate embodiment of the dispenser shown in FIG. 2.

FIG. 3B is a cross-sectional view of an alternate embodiment of the dispenser shown in FIG. 2, as viewed from the right side of the dispenser 10. Unlike the embodiment shown in FIG. 3A which uses a push chain return spring 34 in the magazine 32, the embodiment shown in FIG. 3B uses a push chain return spring 50 located inside the handle 14. In yet another alternate embodiment, not shown, both return springs 34 and 50 can be used.

In FIG. 3B, the left end of the return spring 50 (as viewed in FIG. 3B) is attached to a post located inside the handle, which is not shown in FIG. 3B. The right end of the chain 24 (as viewed in FIG. 3B) is attached to an anchor 36B on the back side 25 of the piston 26. Rotating the sprocket 22 clockwise causes the push chain 24 to drive the piston 26 down the cylinder 12 toward the distal end 28 of the cylinder 12. As the piston 26 moves toward the distal end 28 of the cylinder 12, the return spring 50 is stretched, which exerts a compressive force on the first part of the chain, i.e., the portion between the sprocket 22 and the piston. Releasing the ratchet mechanism on the sprocket 22 enables the return spring 50 to pull the piston 26 and chain 24 back toward the sprocket 22, which drives the second end 38 of the chain 24 back into the magazine 32.

Figure 4:
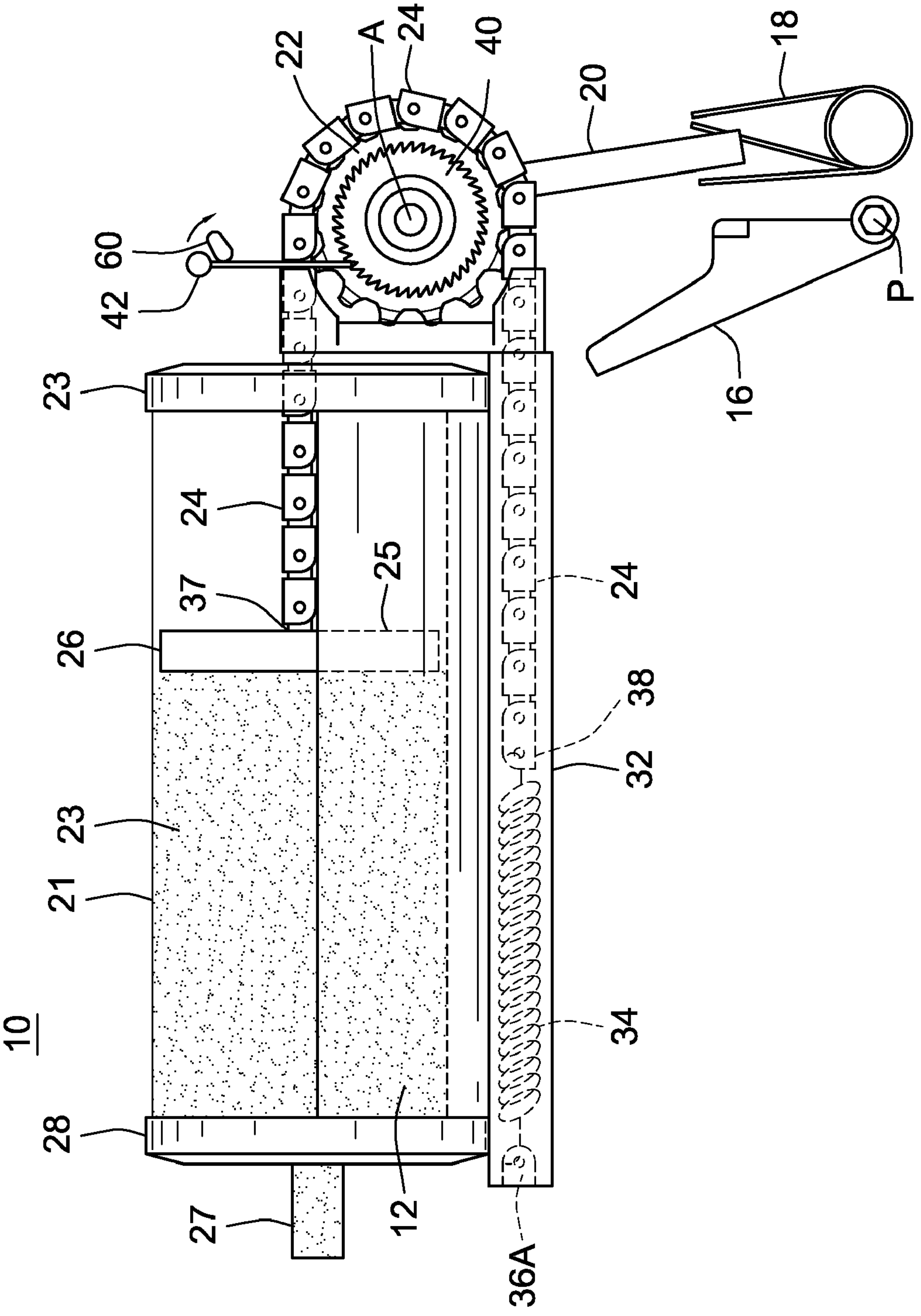
FIG. 4 is a left-side cutaway of the dispenser shown in FIG. 2.

FIG. 4 is a cut away view of the left side of the dispenser 10 shown in FIG. 2 and FIG. 3B. FIG. 4 shows among other things, a ratchet mechanism that allows the push chain 20 and hence the piston 21 to move in only one direction, i.e., toward the distal end 25 of the cylinder 12, until the ratchet mechanism is disengaged. The ratchet mechanism is comprised of the fine-toothed gear 40 attached to the chain sprocket 22 and a spring-loaded locking pawl 42. A bottom end 44 of the locking pawl 42 rides over or "follows" teeth in the gear 40. The gear 40 and sprocket 22 are attached to each other. They rotate together, in the same direction, on the aforementioned unidirectional or one-way bearing, which is also not visible in FIG. 4.

Figure 5C:
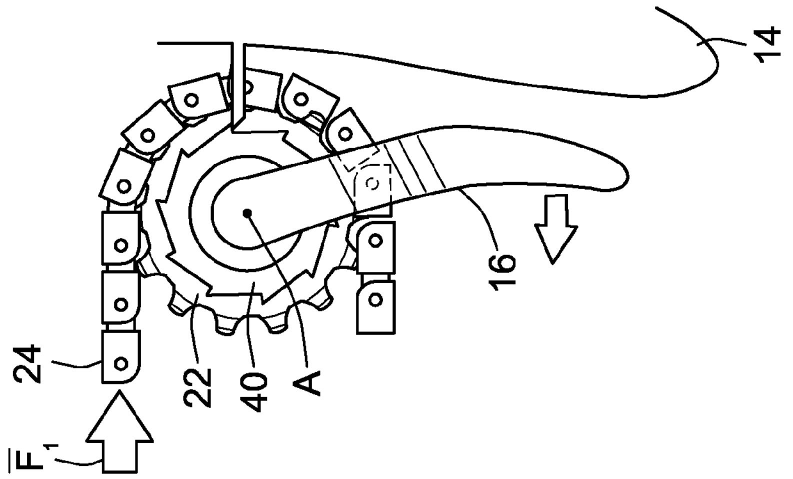
FIG. 5A, 5B, 5C are isolated views of the trigger, sprocket and ratchet mechanism and push chain used in the device shown in FIG. 2.
Figure 5B:
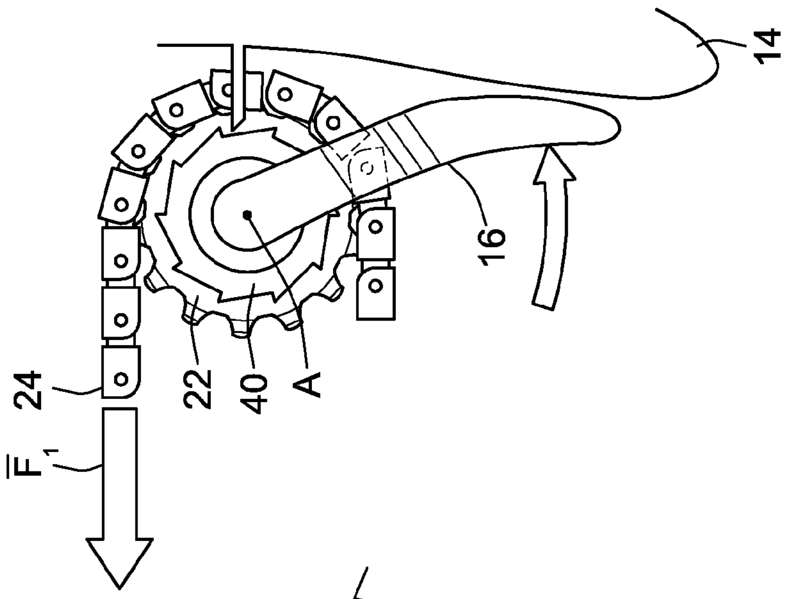
Figure 5A:
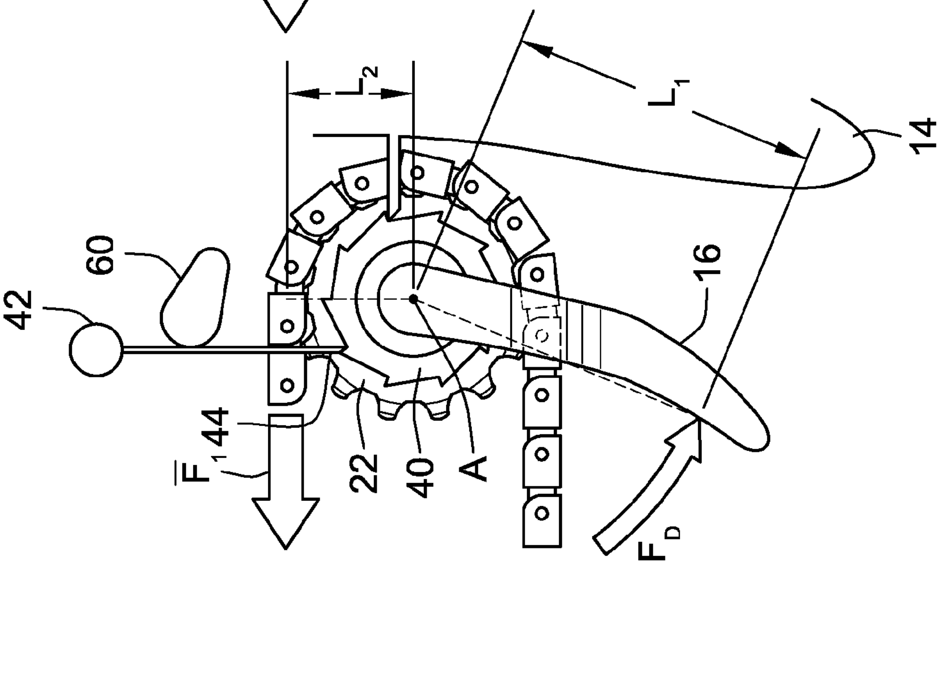

As shown in FIG. 5A, the bottom end 44 of the locking pawl 42 follows teeth on the gear 40 and permits the gear 40 and sprocket 22 to rotate in only one direction, i.e., counterclockwise in FIG. 4 and "away" from the bottom end 44 of the locking pawl 42. The locking pawl 42 is disengaged from the gear 40 by moving the bottom end 44 of the locking pawl 42 away from the gear 40, far enough to allow the bottom end 44 to clear the teeth of the gear 40 and to allow the gear 40 to reverse direction, i.e., rotate clockwise as shown in FIG. 4, counterclockwise as shown in FIG. 3. Rotating the gear 40 and sprocket 22 in a reverse or backward direction retracts the first portion of the push chain 24 from the cylinder 12 and allows the second portion of the push chain to be pulled into the magazine 32 by the push chain return spring 34.

The locking pawl 40 shown in FIG. 4, and its bottom end 44, can be disengaged from the gear 40 by rotating a cam shaft 60 that extends out of the sides of the handle 14. The cam shaft 60 shown in the figure is thus configured to push the bottom end 44 away from the gear 40, if the cam shaft 60 is rotated clockwise or counterclockwise. In an alternate embodiment, a ratchet disengagement mechanism is comprised of a shaft that extends orthogonally out from at least one side of the handle 14. A central part of the shaft inside the handle 14 has an outer diameter that is tapered such that when the shaft is depressed toward or into the handle 14, the taper on the shaft urges the locking pawl 40 sideways, just as the cam 60 would do, and away from the gear 40.

In FIG. 5A, a directed arrow at the bottom of the trigger 16 corresponds to a force $F_0$ exerted on the trigger 16 when a user squeezes the trigger 16 toward or into the handle 14. The force $F_0$ creates a counterclockwise (as shown in FIG. 4; clockwise in FIG. 3) torque on the sprocket 22. The torque created by $F_0$ compresses the trigger return spring 18 at the same time that it urges the sprocket 22 counterclockwise (in FIG. 4). Urging the sprocket 22 counterclockwise impresses a force $F_1$ on the back side 25 of the piston 26. The force $F_1$ exerted on the first part of the chain 24 is thus compressive. The force $F_1$ is applied in a substantially straight line, essentially down, or along, the central axis of the cylinder 12.

In FIG. 5A the directed arrow at the bottom of the trigger 16 depicts a force of magnitude $F_0$ applied to the trigger 16 at a distance $L_1$ from the center of the sprocket 18. That force, acting at a distance $L_1$ from the center of the sprocket 18, creates a torque around the sprocket's axis A, the magnitude of which is expressed as:

$$\Gamma_1 = F_0 \times L_1$$

Driving the sprocket 22 counterclockwise (as shown in the figures) by squeezing the trigger 16 thus creates a reaction force $F_1$ in the push chain 24, which is exerted on the piston 26. The reaction force $F_1$ can be calculated by assuming that just before the chain moves in response to squeezing the trigger, the sum of the moments around the axis of the sprocket is zero. The force $F_1$ on the chain 20 will therefore be equal to:

$$F_1 = \frac{F_0 \times L_1}{L_2}$$

Since $L_2$ is smaller than $L_1$, the quotient of $L_1$ to $L_2$ will be greater than one. The magnitude of the force $F_1$ exerted on the chain 20 (and hence the piston 21 and extrudable material in a canister) by the force $F_0$ will therefore be proportionately greater than the force $F_0$ exerted by a user on the trigger 16, however, the horizontal or lateral displacement of the chain 24 by the actuation of the trigger 16 will be less than the lateral displacement of the trigger 16. Stated another way, the torque multiplication provided by the longer moment arm $L_1$ vis-à-vis $L_2$, multiplies the force $F_1$ applied to the chain 24, to the piston 26 and to extrudable material 23 in a canister 21 within the dispenser 10 but at a "cost" of a reduced horizontal displacement of the chain 24 in the cylinder 21. The ratio of the length of the torque arms $L_1$ and $L_2$ can thus effectuate both a torque/force multiplication as well as a division of the horizontal displacement. Stated another way, the length of the trigger 16 and the diameter of the sprocket 24 can be selected such that a full actuation of the trigger 16 dispenses a fixed or substantially fixed amount of extrudable material 23 from the canister 21. The dispenser 10 can therefore dispense fixed amounts of extrudable material by the full actuation of the trigger 16.

A "full actuation" of the trigger 16 is considered herein to be the rotation of the trigger 16 about its pivot point P, to a point where the locking pawl 42 can engage the next notch in the gear 40. The number of notches or teeth on the gear 40 and the length of the trigger 16 thus effectively determine the angle through which the trigger 16 can be rotated and thus determine the maximum amount of material that can be dispensed with each trigger actuation.

FIG. 5B depicts the trigger 16 at the end of its travel around the axis of the sprocket 22. Additional counterclockwise rotation of the sprocket 22 effectuates additional lateral translation of the push chain 24 toward the left-side of the figure, as well as additional compressive force on the chain 24.

In FIG. 5C, the trigger 16 is released. The trigger return spring (not shown in FIGS. 5A-5C) causes the trigger 16 to return to its starting location and reduces the compressive force on the chain 24. In most embodiments, however, a ratchet mechanism holds the sprocket 22 and chain 24 in place, i.e., does not allow the sprocket to reverse direction.

Figure 6A:
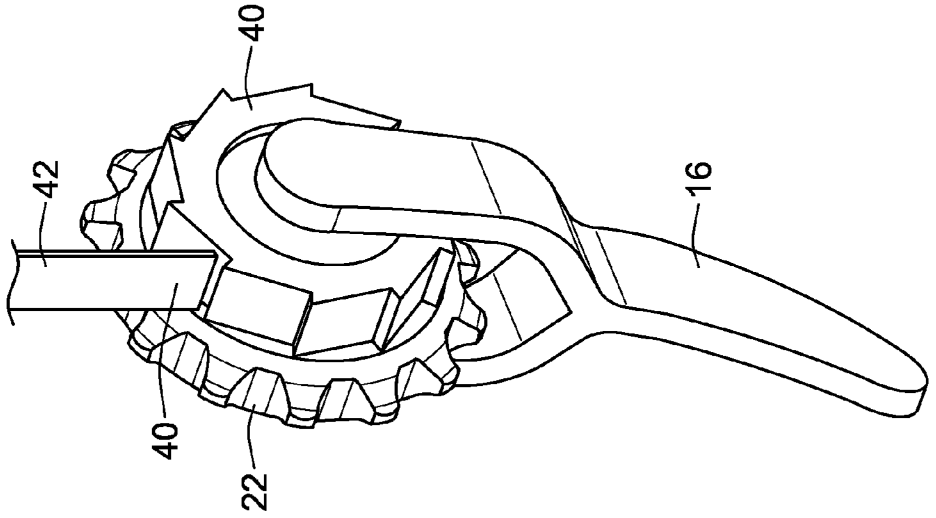
FIGS. 6A and 6B are isolated views of a ratchet mechanism.
Figure 6B:
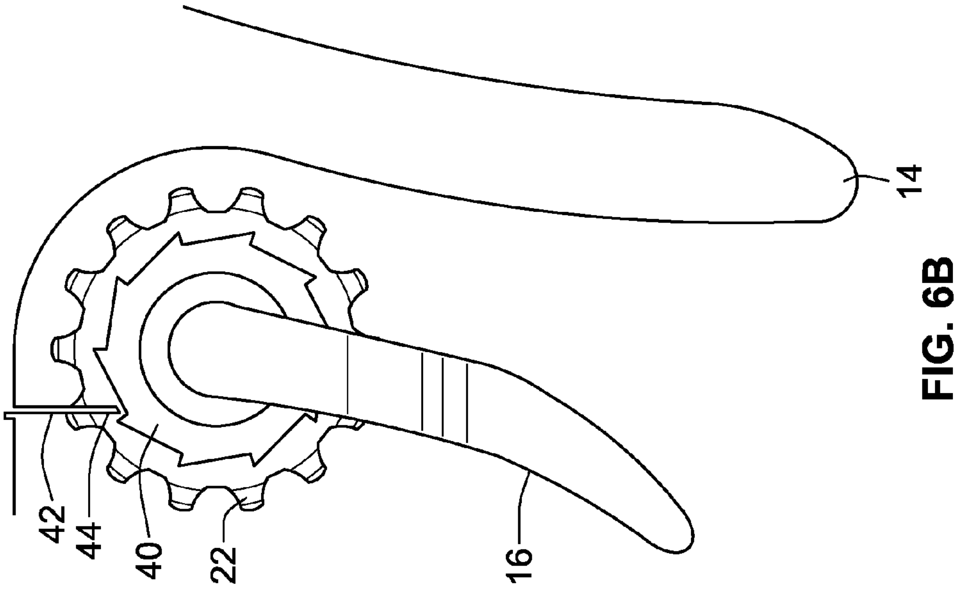

FIGS. 6A and 6B are enlarged, isolated views of the releasable ratchet mechanism depicted in FIG. 5A. In these views, the gear 40 is more clearly seen as being permitted to rotate in only one direction until the bottom end 44 of the locking pawl 42 is moved out of engagement with the gear 40.

FIG. 7 is an end view as seen from the handle/housing 14, which is cut away to show the interior portions of the handle/housing 14. The sprocket 22 can be seen mounted to and rotating on a one-way bearing 66, the opposite ends of which are supported by the handle/housing 14. The push chain 24 can be seen riding over the sprocket 22.

Those of ordinary skill and in mechanical arts will appreciate from the foregoing figures and description that actuation of the trigger 16 around its pivot point P, causes the sprocket 22 to rotate through an angle of rotation around the sprocket's central axis A. The size of the angle of rotation is determined by the length of the moment arm $L_1$ and the angle through which the trigger 16 can rotate about its pivot point. Since the sprocket 22 is provided with a fixed number of teeth that can engage corresponding links of the chain, rotation of the sprocket by the complete actuation of the trigger causes the piston to move down the cylinder 12 by a fixed and identical distance on each actuation of the trigger. The trigger and its angular actuation thus becomes a measurement device. By controlling the angle through which the trigger rotates, it is therefore possible to control the amount of extrudable material dispensed.

For purposes of claim construction, the push chain 24 is considered herein to be a linear actuator, in the sense that it is capable of exerting a compressive force in a substantially straight line without buckling. In a preferred embodiment, the push chain is stored in a magazine shown in the figures as being parallel to and attached alongside the cylinder 12. In an alternate embodiment, the push chain 20 can also be stored into the handle as those of ordinary skill in the art will recognize.

The cylinder, handle, trigger and push chain can be fabricated from metal, plastic or carbon fiber. While the return springs 34 and 50 are preferably metal, an elastic band can be substituted for the return spring 34 or 50.

Figure 8:
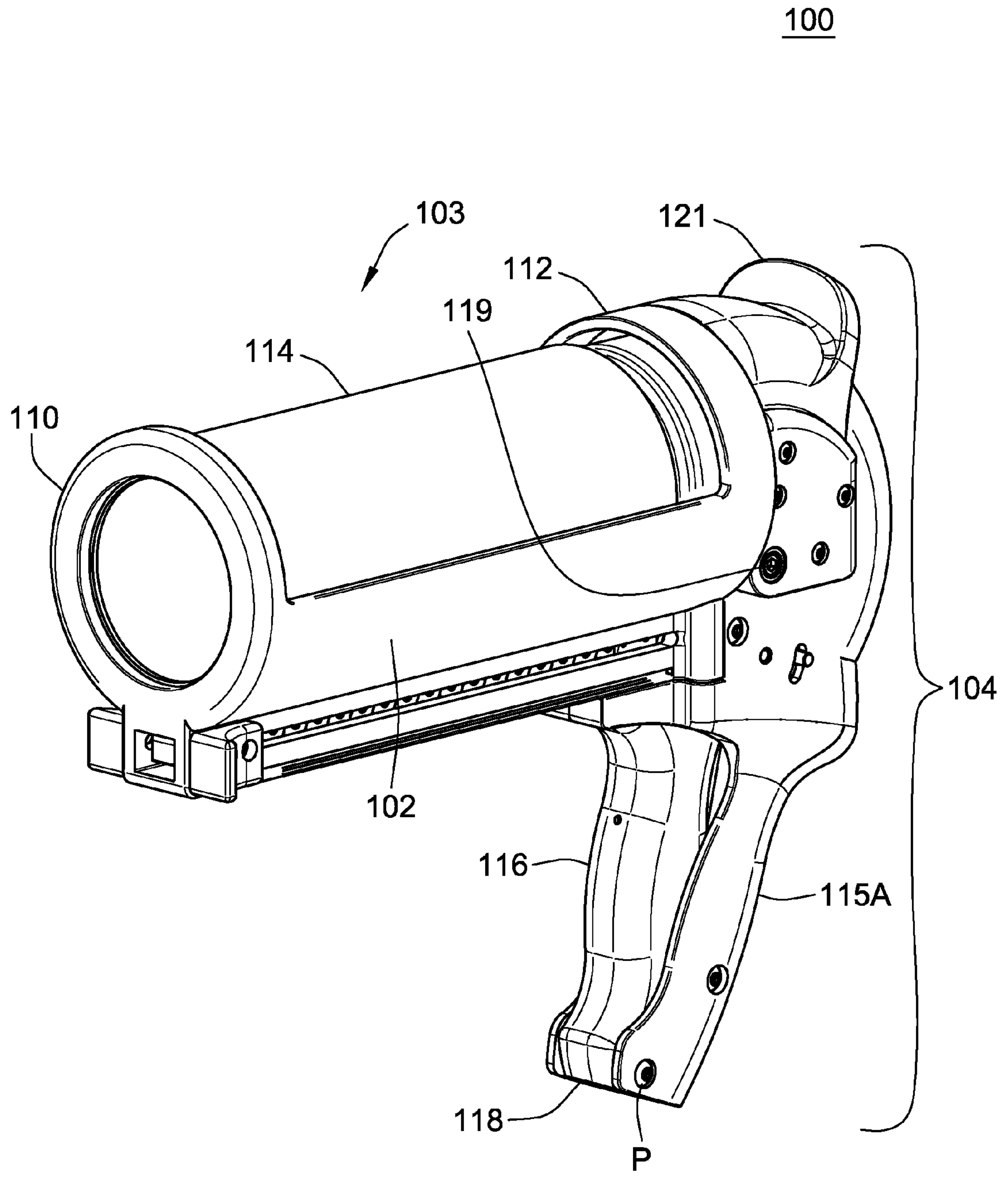
FIG. 8 is a perspective view of the left-hand side of a preferred embodiment of a rodless dispenser.

FIG. 8 is a perspective view of a preferred embodiment of a rodless dispenser 100 for extrudable materials. As with the rodlessextrudable material dispenser 10 described above, the dispenser 100 shown in FIG. 8 is comprised of a substantially cylindrical housing 102, approximately one-half of which is removed, the removed portion having a shape reminiscent of a Quonset hut, which is a well-known structure having a semicircular arching roof. Despite the fact that approximately half the housing 102 is removed, for brevity, clarity and simplicity, the shape of the housing 102 depicted in FIGS. 8 et seq. is hereinafter referred to interchangeably as simply housing as well as a cylindrically-shaped housing.

As can be seen in FIG. 8, the housing has an elongated Quonset-hut shaped opening 103 through which a disposable tube 114 of extrudable material can be inserted into and removed from the dispenser 100. A handle assembly 104 is attached to a first or proximal end 112 of the housing 102. The opening 103 is sized and arranged to enable the disposable tube 114 to slide through the opening 103 and within the housing 102 between the distal end 110 and the proximal end 112. A trigger 116 rotates or pivots around a pivot point P, which is located at the bottom or lower end 118 of the handle assembly 104.

Figure 9:
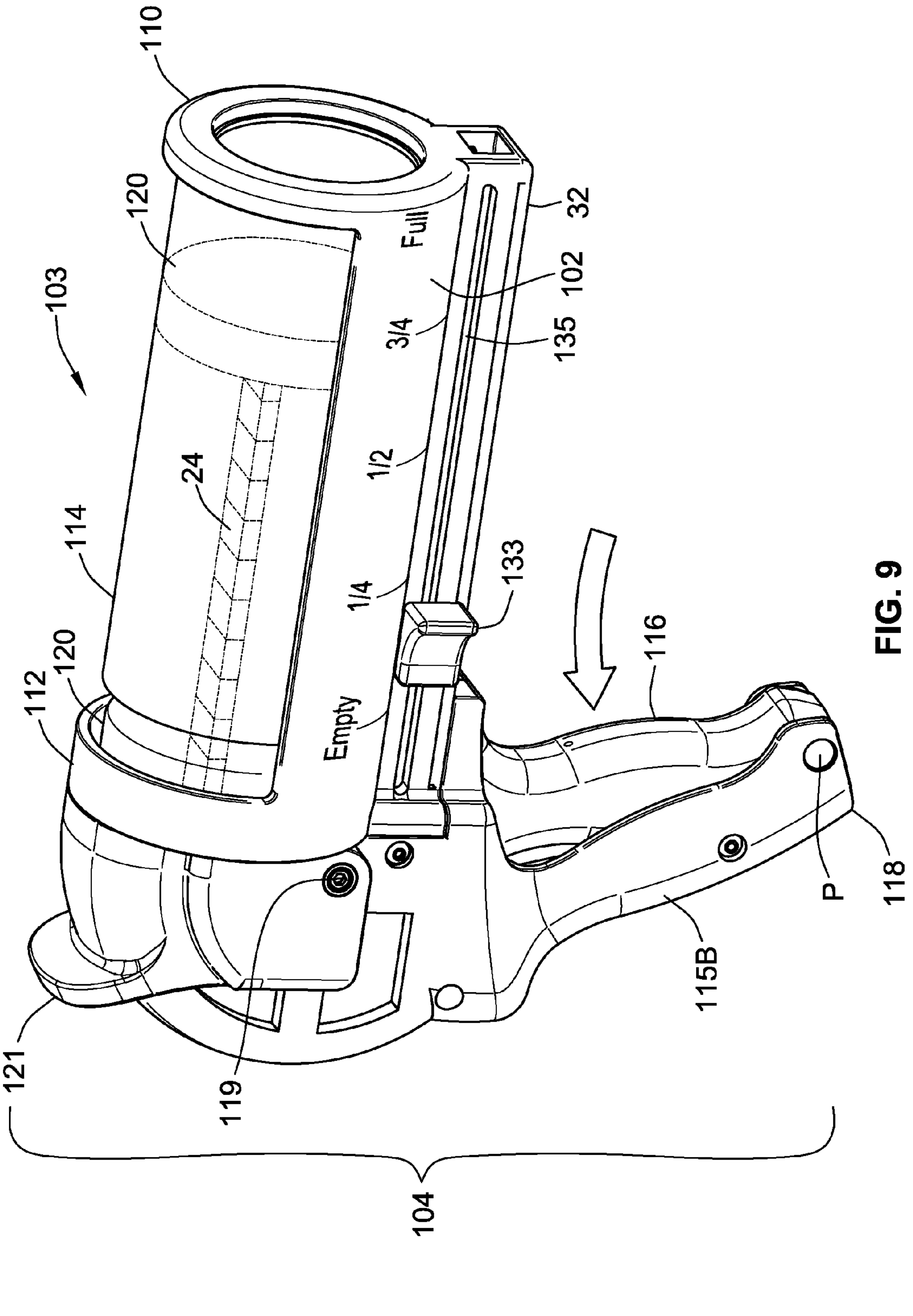
FIG. 9 is a perspective view of the right-hand side of the rodless dispenser depicted in FIG. 8.

FIG. 9 is a perspective view of the right-hand side of the rodless dispenser 100 depicted in FIG. 8. This figure shows a translatable piston 120 in phantom lines to show the piston 120 partway down the interior of a disposable tube 114 of extrudable material. The amount of extrudable material remaining in the disposable tube 114 is indicated by graticules or markings along the right-hand side of the housing 102, just above the push chain magazine 32. A narrow slot 135 is formed into the side of the magazine 32. A handle 133 attached to the second end 38 (not visible in FIG. 9) of the push chain 24 projects outwardly through the slot 135. The handle 133 effectively points to a reticle or graticule on the housing as well as provides a grasp for a user to manually move the push chain 24.

As described above with regard to the dispenser 10 shown in FIGS. 1-8, rotation of the trigger 116 in the dispenser 100 around the pivot point P causes the piston 120 inside the housing 102 to be driven toward the distal end 110 of the housing 102. When the piston 120 works against a second piston (not shown in FIGS. 8 and 9) within a tube of extrudable material, the piston 120 drives extrudable material from an opening in the distal end of the disposable tube 114, and from an opening in the housing 102 that is also located the distal end 110 of the housing 102.

Figure 10:
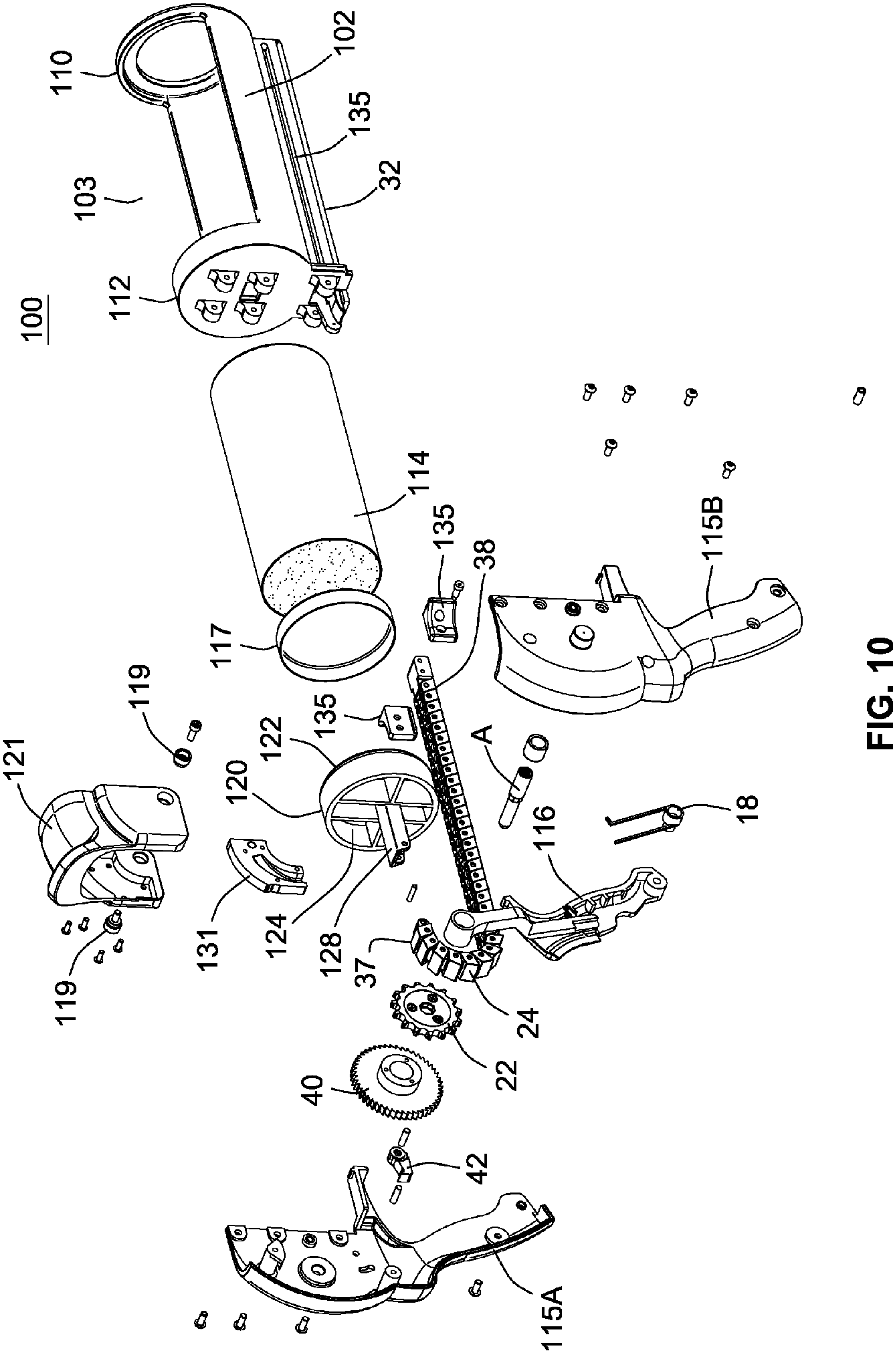
FIG. 10 is an exploded view of the rodless dispenser for extrudable material shown in FIG. 8 and FIG. 9.

FIG. 10 is an exploded view of the rodless dispenser 100 for extrudable material shown in FIG. 8 and FIG. 9. The handle assembly 104 is comprised of mating left and right handle halves 115A and 115B, which provide among other things, embossments in each half that support rotating and non-rotating axle shafts. The aforementioned trigger mechanism 116 rotates around the pivot point P and which compresses the aforementioned return spring 18. The trigger 116 causes the aforementioned sprocket 22 to drive the first end 37 of the push chain 24 toward the back side 25 of a first piston 120. As the sprocket 22 rotates, the fine-toothed gear 40 rotates with the sprocket 22 and is prevented from rotating counterclockwise by a spring loaded locking pawl 42, which acts as a one-way ratchet mechanism until it is released. A ratchet release is provided by a ratchet release handle 121, which pivots/rotates around two axles/hinges, identified by reference numeral 119 and a ramp assembly 131. The ramp assembly 131 fits inside the ratchet release handle 121 and drives the locking pawl 42 horizontally, away from and out of engagement with the gear 40 as the handle 121 is drawn counterclockwise (as viewed in FIG. 10).

Figure 11:
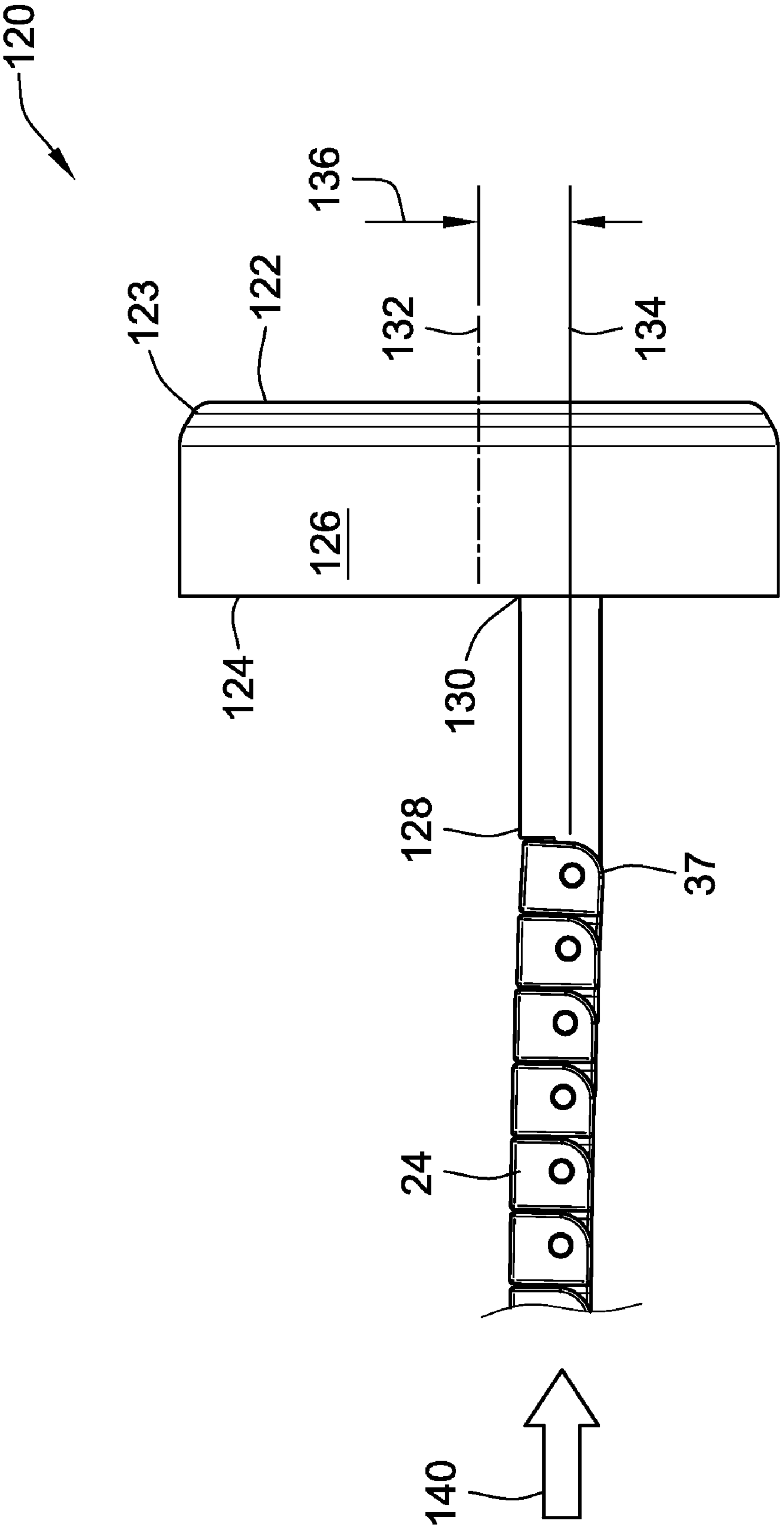
FIG. 11 is a side view of a preferred embodiment of a piston having a fixed, extended length piston rod.

FIG. 11 is a side view of the piston 120 shown in FIG. 10 and which is used in the dispenser 100 depicted in FIGS. 8 and 9. The piston 120 is disk-shaped, i.e., circular and having a front face or head 122. The outside edge of the piston face 122 is beveled, giving the piston face a taper 123, at least around the outside edge. Opposite the piston face 122 is a piston base 124. A piston rod 128 (also known as a connecting rod 128) is rigidly attached to the piston base 124 at a location 130 on the piston base 124 offset or away from the center line 136 of the piston 120. A piston skirt 126 extends from the piston face 122 towards the base 124. In one embodiment, the skirt extends past or beyond the base 124 and surrounds at least part of the piston rod 128. The first end 37 of the push chain 24 is rotatably attached to the bottom of the piston rod 128.

The location on, or the area of the piston base 124 where the piston rod 128 extends from, is referred to hereinafter as the piston rod attachment point 130. Those of ordinary skill in the art will recognize that regardless of the area of the attachment "point" 130 an axial, compressive force 140, transmitted through the push chain 24, can be considered to be exerted on the piston rod 128 along a geometric center line 134 of the chain 24. The geometric center line 134 of the push chain 24 is thus the line through which the axial force 140 is applied to the base of the piston 120.

A compressive, axial force 140 exerted by the push chain 24 on the back side or back face 124 of the piston 120 through the connecting rod 128, offset from the piston center line 132, will urge the piston 120 into a second piston 117 located inside a tube 114 of extrudable material (not shown in FIG. 11), however, the fact that the axial force 140 is applied to the piston base, offset from the piston center line 132 urges the piston to rotate counterclockwise as shown. Stated another way, when the piston 117 inside a tube 114 of extrudable material is driven into the extrudable material, a reactive force, distributed across the area of the piston 117, effectively acts through the center line 132 of the piston 117, which is also the centerline 132 of the piston 120 of the dispenser. Since the center line 132 of the piston 117 corresponds to the center line of the first piston 120, applying a compressive force against backside of the piston 120 and offset from the piston's centerline, tends to urge the piston 120 to rotate counterclockwise. A counterclockwise bias of the piston 120 and as a result, the piston rod 128 locks the push chain 24.

Figure 12:
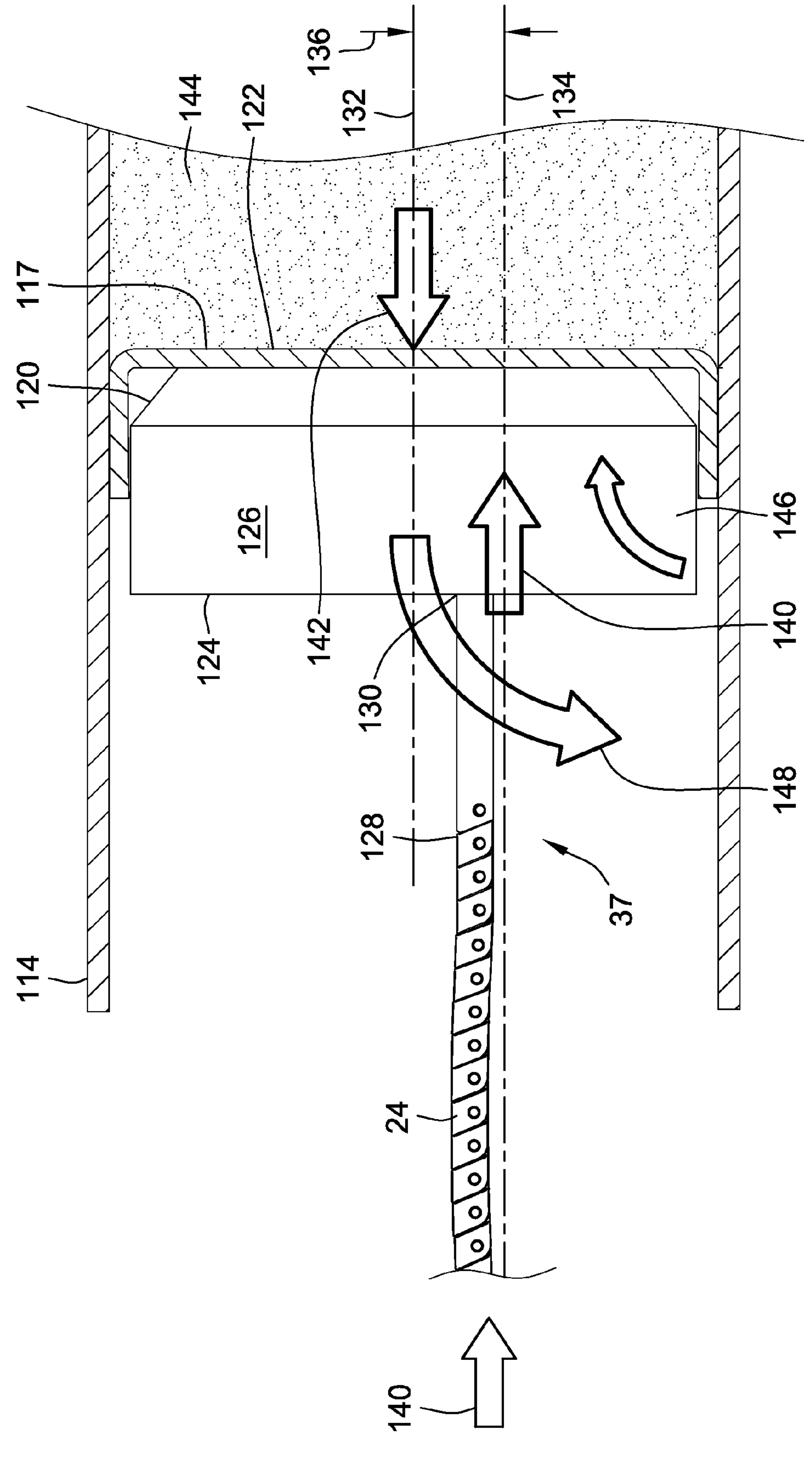
FIG. 12 is a cross-sectional diagram showing the piston of FIG. 11 in a rodless dispenser.

FIG. 12 is a cross-sectional diagram showing the piston 120 of the rodless dispenser 100 configured to apply a force against a second, cup-shaped piston 117 within a replaceable tube 114 of extrudable material 144. As described above with regard to FIG. 11, the piston 120 of the dispenser 100 has a skirt 126, which extends around the face 122 of the piston and which extends from the piston face 122 backwardly toward the piston base 124. The piston base 124 is considered to be a surface that is opposite the face 122.

The piston rod 128 is rigidly attached to the piston base 124 at a point 130 offset from the piston's geometric center line by a predetermined distance 136. The distance 136 is determined empirically and varies with factors that include the inside diameter of the tube 114, outside diameter of the piston 120, length of the piston skirt 126, characteristics of the push chain 24 and viscosity of the extrudable material, in order to cause the piston rod 128 to rotate counterclockwise an amount sufficient to lock the push chain 24.

In FIG. 12, an axial force 140 exerted on the push chain 24 from the sprocket 22 drives the piston 120 into the second piston 117. When the second piston 117 is urged into the extrudable material 144, a reactive force 142 from the extrudable material 144 that the second piston 117 faces in the tube 114 is distributed across the face of the second piston 117. The reactive force 142 acts through the center line 132. The reactive force 142 from the extrudable material 144 thus acts through the geometric center line of the first and second pistons as shown.

Applying an axial compressive force 140 offset from the center line 132 of the piston 120 tends to create a clockwise-oriented torque 146 on the piston 120, however, the reactive force 142 from the extrudable material 144 creates a larger counterclockwise reactive torque 148 on the piston 120 and piston rod 128. The reactive torque 148 tends to push or rotate the piston 120 in a counterclockwise direction. Counterclockwise rotation of the piston 120 effectuates a counterclockwise rotation of the connecting rod 128, which in turn tends to urge the push chain links in a counterclockwise direction causing them to lock in place.

As drawn, FIG. 12 shows the chain 24 without any compressive load on it in order to show that the unloaded chain 24 has a convex bow, i.e., the curve opening or facing downwardly, when there is no compressive load on the chain 24. The chain 24 thus curves slightly above the reference line 134 before a compressive load is applied to it.

As described in the applicants' co-pending U.S. patent application Ser. No. 12/703,565, which was filed Feb. 10, 2010, and entitled Push Chain with a Bias Spring to Prevent Buckling, the contents of which are incorporated herein by reference in their entirety, transmitting a compressive force through the chain 24 will tend to bend or deflect the chain 24 downwardly, (as shown in the figures) due to a reactive torque 148 acting on the piston 120 from the load it works against. If the push chain 24 were initially flat, or worse, concave (opening upwardly), the reactive torque 148 might deflect one or more links to an extent whereat a reactive axial force 142 acts on a line through a point below a link's axis of rotation (as shown in the figure). If the chain 24 were to deflect such that a compressive force were to be applied to act on a link at a point below its axis of rotation (as shown in the figure), the link would rotate around the connecting pin (clockwise in the chain 24 shown in FIG. 12) causing the chain to buckle. The resting, unloaded curvature of the chain 24, such as the one shown in FIG. 12 is thus important to maintain the chain's locked state. The amount of resting, no-load curvature is determined empirically and will depend on factors that include the link geometry and reactive torque and compressive loads it is subjected to in operation.

The piston rod 128 on the back side 124 of the piston 120 is located such that compressive force 140 from the chain 24 is through a line of action offset from the piston's center line. In the figure, the line of action is "below" the center line of the piston but "above" the axis of rotation of the connecting pins holding the individual links together. In the chain shown in FIGS. 11 and 12, the links will remain locked against each other (and the chain locked straight) as long as the axial reactive force from the piston acts through a line that is above the axis of rotation of the pins that hold the chain link bodies together.

FIG. 13 is a cut-away view of a preferred embodiment of a rodless dispenser for extrudable materials, which is comprised of a push chain 24 and extended-length piston rod 28. In FIG. 13, the piston 120 is shown in its fully-retracted position. As is well known, most tubes 114 of extrudable are filled with extrudable material and provided with an interior piston 117. Driving the piston 117 in the tube 114 forces material from the tube 114.

Many types of extrudable-material containing tubes are provided with a temporary adhesive or seal between the inside wall of the tube 114 and the interior piston 117. Other types of extrudable-material containing tubes have pistons 117 that are simply difficult to move from their starting location. Moving the interior piston 117 from an initial starting point in a tube 114 can be problematic for a rodless dispenser using a push chain because when a full tube 114 is first installed into the rodless dispenser, and when the dispenser's piston 120 is usually in a position where no load is presented to the piston 120 until the piston 120 is moved forward to engage the tube's interior piston 117. As set forth above, the links of a push chain, such as the one shown in FIGS. 12 and 13A will stay locked as long as they are subjected to an axial compressive force that acts through a line of action located on the engagement or projection side of the pins' axes of rotation. Stated another way, the absence of a reactive force to keep the links of a push chain locked risks having the chain buckle before a compressive force or load can be applied.

Figure 13A:
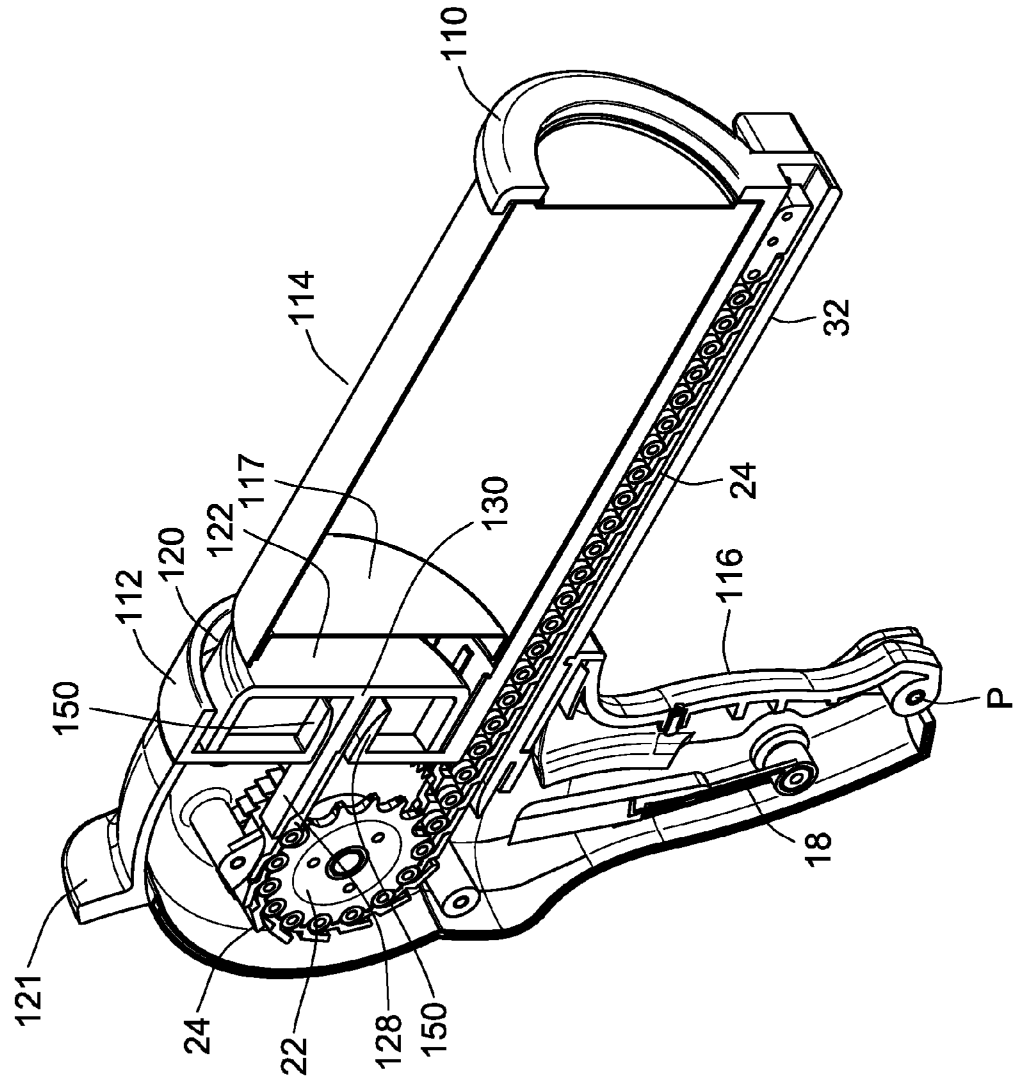
FIG. 13A shows the piston and extended piston rod at its fully-retracted position with the dispenser of FIG. 8 and FIG. 9.
Figure 13B:
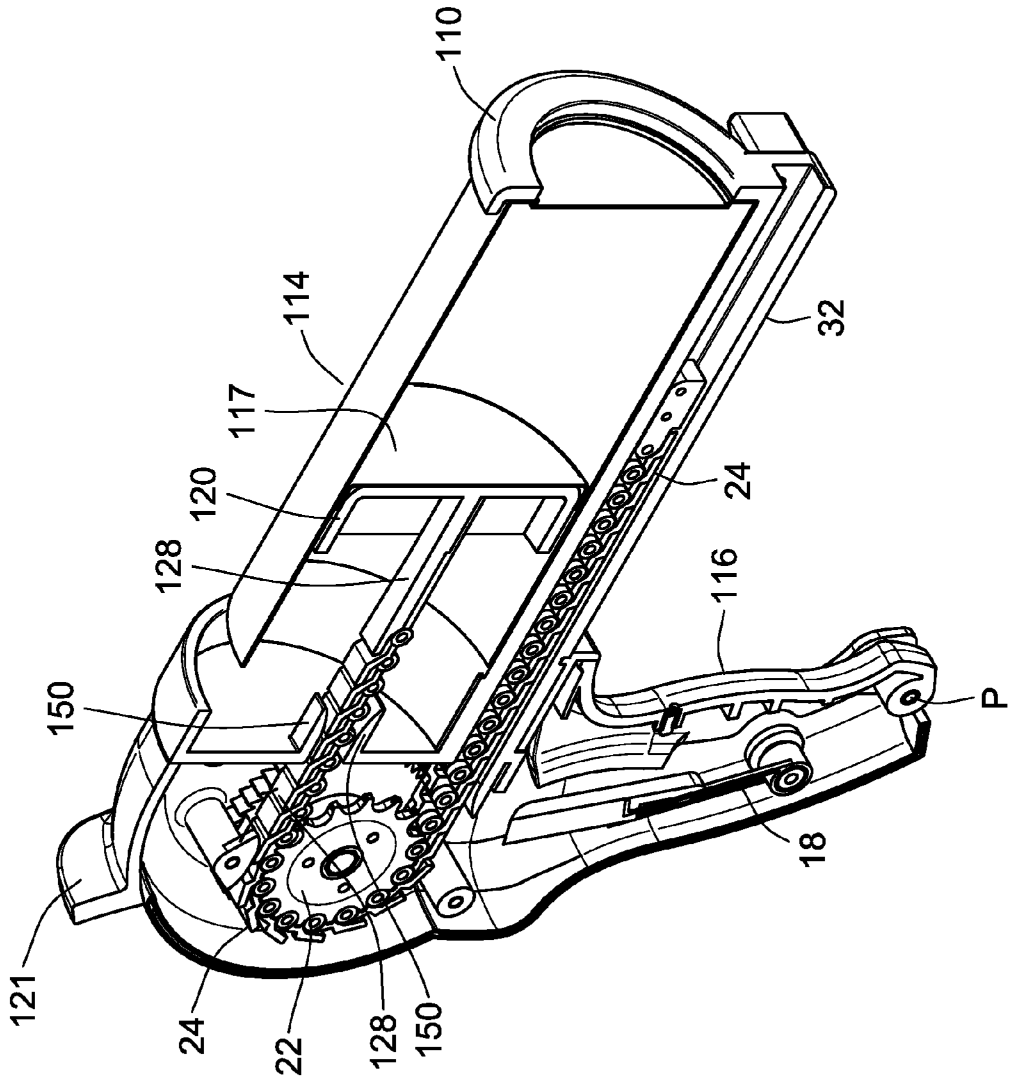
FIG. 13B shows the piston and the extended piston rod away from its fully-retracted position.

FIGS. 13A and 13B show how an extended length piston rod 128 enables the push chain 24 to drive piston 120 within the housing 102, up to where the piston 120 makes contact with the piston 117 within the tube 114, without a reactive counterforce. In FIG. 13A, two chain alignment tabs 150 extend horizontally away from the proximate end 112 of the housing and keep the chain and its constituent links straight or at least substantially straight so as to avoid having the chain buckle. The tabs 150 keep the chain links essentially horizontal (excepting unloaded curvature described above) in order prevent them from buckling without there being an axial force on the links to keep them locked. The tabs' 150 length is determined empirically but they are configured to be long enough to allow the piston 120 to be moved into engagement with an opposing force, such as the interior piston 117 as well as allow a force to be applied to the piston 117 to break any sort of seal that might be used with the piston 120 and tube 114. Stated another way, the tabs 150 and the extended length piston rod 128 maintain a horizontal alignment until the push chain 24 is subjected to reactive forces described above and shown in FIG. 12.

Figure 14:
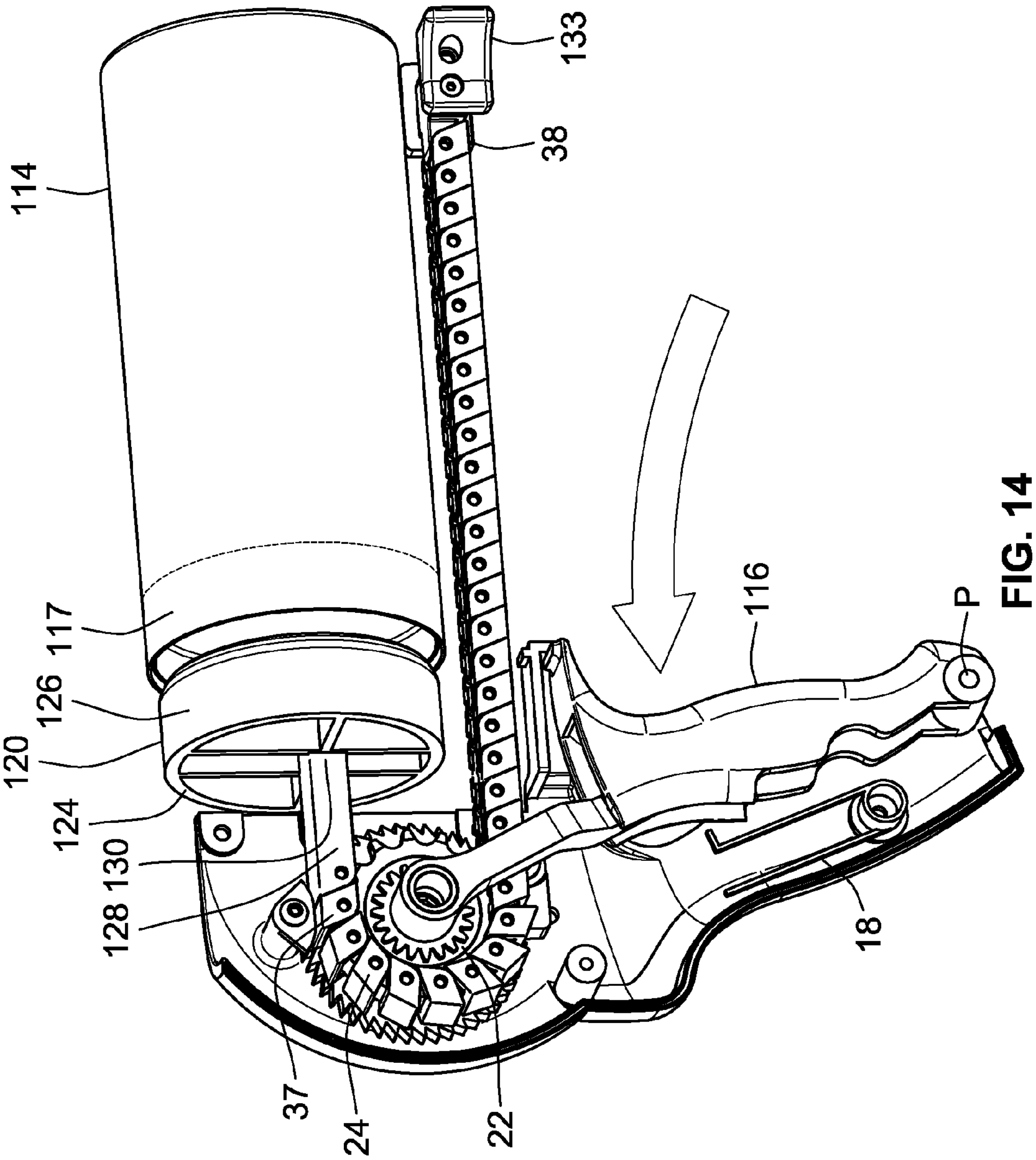
FIG. 14 is a second view showing the piston and extended piston rod at its fully retracted position.

Importantly, the piston rod 128 is formed to have a U-shaped channel that allows the piston rod 128 to extend over several teeth in the sprocket 122 as shown in FIG. 14. When the piston 120 is fully refracted, sprocket 122 rotation drives an essentially rigid piston and piston rod through the tabs 150. The elongated tabs 150 and elongated piston rod keep the piston rod 128 horizontal until the piston 120 can move far enough into preferred embodiments of a tube 114 where the piston 120 can engage the inner piston 117. Once the piston 120 engages an opposing force, such as the inner piston 117, reactive forces lock the chain.

In a preferred embodiment, the piston rod 128 is long enough to extend at least part way over the sprocket 22 such that at least one tooth of the sprocket 22 is covered by the U-shaped channel. The piston rod 128 should be long enough to drive the piston 120 far enough into the second piston 117 to have the second piston 117 engage extrudable material within the disposable tube 114.

Another important aspect of the piston 120 is that the length of the piston skirt 126 should be chosen to keep the piston 120 from binding inside the tube 114 as the piston 120 is subjected to torque from the axial force 140 and the reactive force 142. In a preferred embodiment the skirt 126 has a length and the piston 120 has a diameter, the ratio of which is between about 1:1 up to about 1:6.

Figure 15:
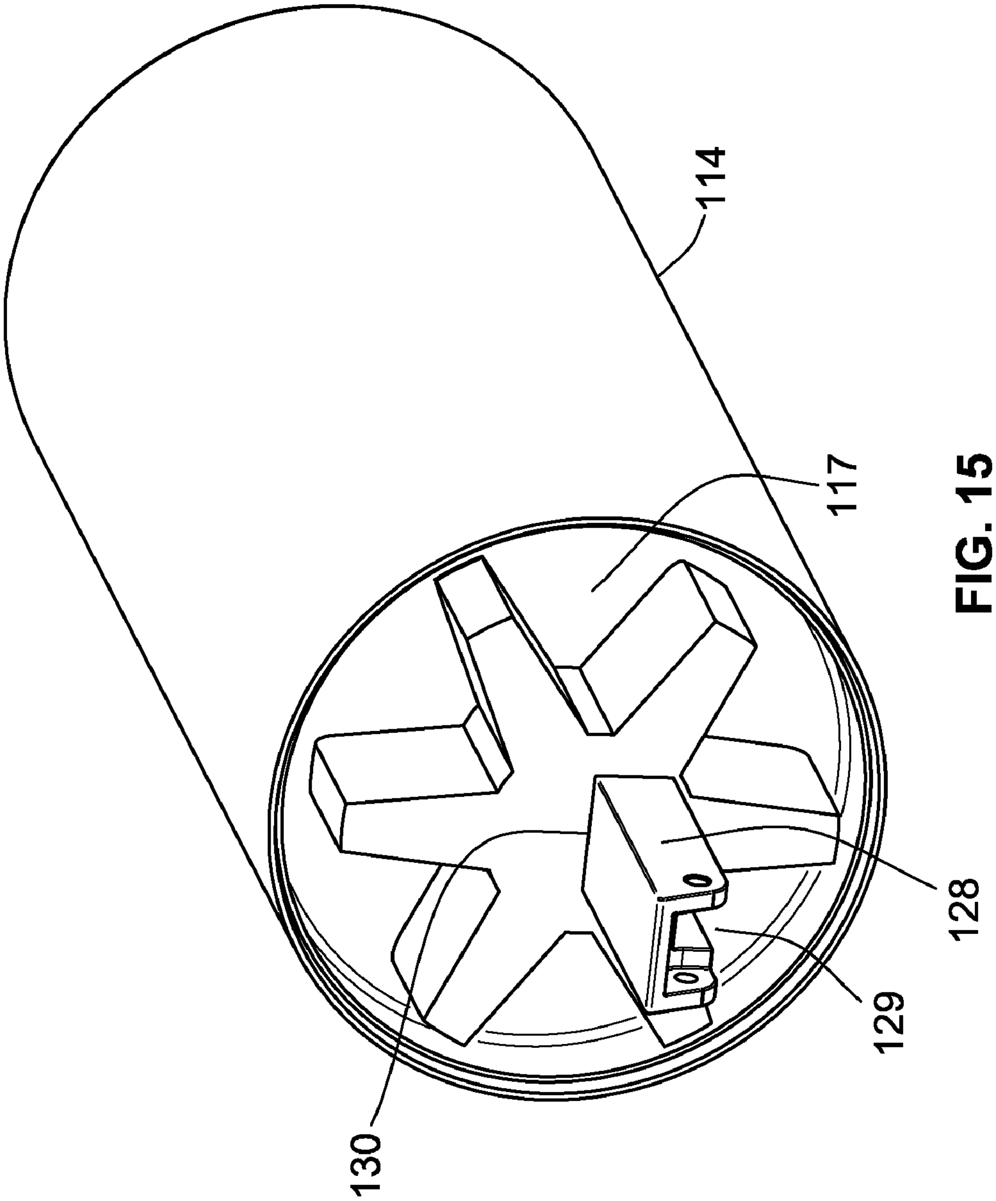
FIG. 15 shows an alternate embodiment of a piston and extended length piston rod.

While the preferred embodiment of piston 120 shown in the figures is disk-like, FIG. 15 shows an alternate embodiment of a piston. In FIG. 15, the piston 120 is embodied as a six-segment regular closed polygon having an extended length push rod 128 formed with a U-shaped channel that extends over teeth of the sprocket 22.

The foregoing description is for purposes of illustration only. The true scope of the invention is defined by the appurtenant claims.

What is claimed is:

1. A rodless dispenser for extrudable material, the rodless dispenser comprising:

a first translatable piston (first piston) having a piston head configured to apply a force against a second translatable piston (second piston) in a replaceable tube of extrudable material, the first piston having a skirt, which extends at least part way around the first piston face, the skirt extending from the first piston face toward a base of the first piston, the first piston base being opposite the first piston face, the first piston also having a geometric center axis that extends through the first piston base and the first piston face;

a push chain (chain) comprised of a plurality of links, the links being configured to be rotatable around each other in a first direction and incapable of rotating around each other in an opposite, second direction, the chain capable of exerting a compressive force when said links are urged to rotate in said second direction, a first end of the chain being attached to the first piston base at an application point offset from the first piston geometric center axis by a first distance, the application point being located below the geometric center axis of the first piston;

wherein, when a replaceable tube of extrudable material is in the rodless dispenser and said first piston is against the second piston, a compressive force applied by the push chain creates an opposing reactive force against the first piston face from the second piston, the opposing reactive force from the second piston causing the first piston to urge at least some of the push chain links to rotate in the second direction.

2. The rodless dispenser of claim 1, further comprised of a piston rod having a first predetermined length and being rigidly attached to the first piston base at the application point.

3. The rodless dispenser of claim 2, wherein the application point and first distance are selected and configured such that when a compressive force acts through a centerline of the piston rod, it produces an opposing reactive from the piston force that urges the piston rod to rotate around the application point in the second direction.

4. The rodless dispenser of claim 3, wherein the chain is curved prior to application of the compressive force, the curve being selected such that the chain is substantially straight after application of the compressive force.

5. The rodless dispenser of claim 3, wherein the piston rod has a length such that, when a replaceable tube of extrudable material is full and first inserted into the rodless dispenser, and when said first piston face abuts the second piston when said replaceable tube is full, the first piston rod length extends from the first piston base into engagement with at least one tooth of a drive a sprocket for the push chain, the drive sprocket being configured to rotate in the first direction and directly drive the piston rod and first piston toward the second piston, creating said reactive force.

6. The rodless dispenser of claim 5, wherein the rodless dispenser is further comprised of at least one chain alignment tab, the at least one chain alignment tab holding links of the chain substantially straight.

7. The rodless dispenser of claim 4, wherein the sprocket, push chain and piston rod are configured such that displacement of the second piston from an initial position starting position generates said reactive force.

8. The rodless dispenser of claim 1, wherein the skirt has a length and the piston has a diameter, the ratio of the skirt length to piston diameter being between about one to one, up to about one to six.

9. The rodless dispenser of claim 2, wherein the skirt has a length, which extends beyond the piston base and which surrounds at least part of the piston rod.

10. The rodless dispenser of claim 1, wherein the piston face is comprised of a taper around the first piston face.

11. The rodless dispenser of claim 5, wherein the taper is a truncated cone.

12. The rodless dispenser of claim 1, wherein the piston has a cross-sectional shape that is a closed regular polygon.

13. A rodless dispenser for extrudable material, the rodless dispenser comprising:

a housing having first and second ends and an opening configured to receive a tube of extrudable material therein, the housing having a geometric center axis, which extends through the first and second ends;

a first translatable piston having a piston head configured to apply a force against a second piston in a replaceable tube of extrudable material in said housing, the first piston having a skirt at least part way around the face and which extends toward a piston base the opposite side of which is the first piston face, the first translatable piston also having a geometric center axis of symmetry, which is substantially collinear with the housing geometric center axis;

a push chain (chain) comprised of a plurality of links, the links being configured to be rotatable around each other in a first direction but incapable of rotating in an opposite, second direction, the chain also capable of exerting a compressive force when said links are urged to rotate in said second direction, a first end of the chain being attached to the piston base at an application point that is radially offset from the first piston's axis of symmetry by a first distance in a first direction, the application point being located below the application point of the first translatable piston;

a chain sprocket (sprocket) mounted in the dispenser and rotatable around an axis in first and second directions, the axis being substantially orthogonal to the geometric center axes of the housing, the push chain links being rotated around at least part of the sprocket in said first direction;

wherein, when a replaceable tube of extrudable material is in the rodless dispenser, a compressive force applied by the push chain at the application point creates an opposing reactive force against the first translatable piston face, the opposing reactive force causing the first translatable piston to urge the push chain links to rotate in the second direction.

14. The rodless dispenser of claim 13, wherein said first direction is away from an opening in said housing.

15. The rodless dispenser of claim 13, further comprised of a piston rod having a first length and being rigidly attached to the piston base at the application point and wherein the chain is attached to the piston rod.

16. The rodless dispenser of claim 13, wherein the skirt has a length and the piston has a diameter, the ratio of the skirt length to piston diameter being between about one to one, up to about one to six.

17. The rodless dispenser of claim 13, wherein the skirt is substantially cylindrical, the skirt having a length.

18. The rodless dispenser of claim 15, wherein the skirt has a length, which extends beyond the piston base and which extends away from the base to surround at least part of the piston rod.

19. The rodless dispenser of claim 13, wherein the piston face is comprised of a tapered crown.

20. The rodless dispenser of claim 19, wherein the tapered crown is a truncated cone.

21. The rodless dispenser of claim 13, further including a ratchet mechanism coupled to the sprocket, the ratchet mechanism controllably allowing the sprocket to rotate in one of the first direction and the second direction.

22. The rodless dispenser of claim 13, further comprised of a push chain magazine.

23. The rodless dispenser of claim 22 wherein said piston rod is configured such that the piston rod engages said ratchet mechanism when said push chain is fully retracted into said push chain magazine.

24. The rodless dispenser of claim 1 further comprising a piston rod having first and second ends, the first end being attached to the first piston base at the application point, and wherein the push chain is attached to the second end of the piston rod.

25. The rodless dispenser of claim 13, further comprising a piston rod having first and second ends, the first end being attached to the first piston base at the application point, and wherein the push chain is attached to the second end of the piston rod.

* * * * *

UNITED STATES PATENT AND TRADEMARK OFFICE

CERTIFICATE OF CORRECTION

PATENT NO. : 8,381,950 B2
APPLICATION NO. : 12/703613
DATED : February 26, 2013
INVENTOR(S) : Loren Veltrop et al.

It is certified that error appears in the above-identified patent and that said Letters Patent is hereby corrected as shown below:

On the title page item (63), under the heading "Related U.S. Application Data" the Continuation-in-part application no. '12/684,579' instead should read --12/684,597--.

In the Claims,

In claim 13 at column 12, line 7 the words 'application point' should instead read --geometric center axis--.

Signed and Sealed this
Thirtieth Day of June, 2015

Michelle K. Lee
*Director of the United States Patent and Trademark Office*